Dec. 8, 1959  C. A. NICITA  2,916,635
MEANS FOR CONTROLLING THE SPEED OF TURBINES
Filed May 29, 1956
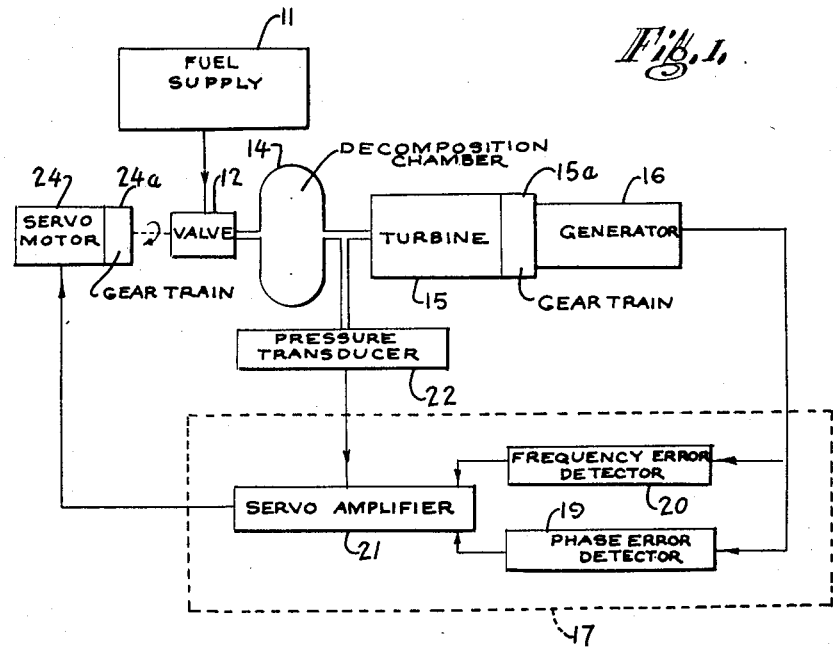
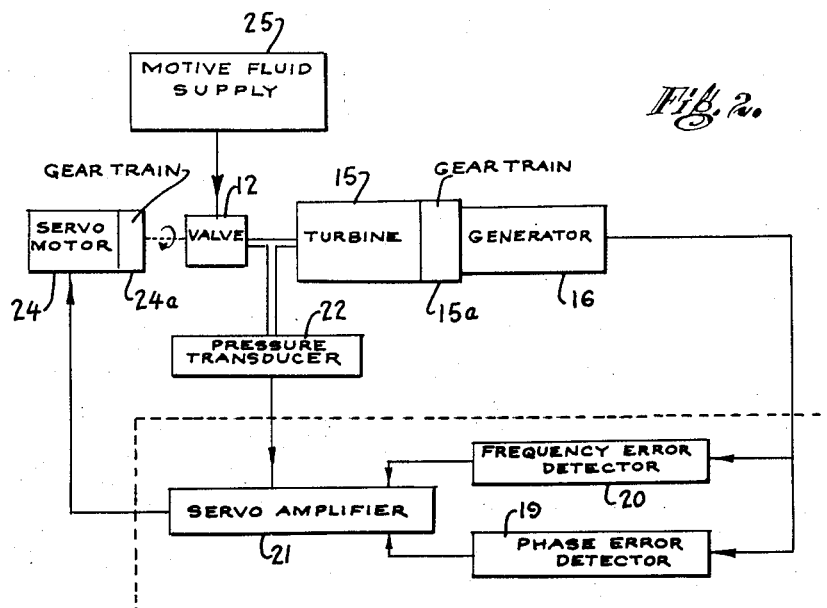
INVENTOR
Charles A. Nicita
BY
J. William Carson
ATTORNEY

United States Patent Office 2,916,635
Patented Dec. 8, 1959

2,916,635
MEANS FOR CONTROLLING THE SPEED OF TURBINES

Charles A. Nicita, New York, N.Y., assignor to Specialties Development Corporation, Belleville, N.J., a corporation of New Jersey Application May 29, 1956, Serial No. 588,007

5 Claims. (Cl. 290—40)

This invention relates to turbo-generator power packages or units, and, more particularly, to speed control means for such power packages.

In operation of turbines, particularly those which operate at high speeds, a load compensating type of control is required to prevent "runaway" or "stalling." A runaway turbine is vulnerable to bearing failure or blade breakage and consequent self destruction and, obviously, a stalled turbine or a turbine tending to stall will result in an output power failure.

Where a turbo-generator unit is to be used for furnishing auxiliary power in the control system of a craft or vehicle, for example a guided missile, extremely close speed control is an absolute requirement to avoid deviations from the flight course, lag in response to commands, or failure to remain in synchronism with its components.

In order to maintain such speed control, it may be required to correct frequency and adjust phase within a fraction of a second after any change in load.

A common practice in speed control is to measure the output of the generator frequency-wise by the use of electronic components having frequency sensitive characteristics, such as by capacitance and inductance networks, and phase-wise by comparing the output to a standard oscillator. Detected error signals are then summed and directed to a servo-motor controlling a motive fluid metering valve. A plot of the speed error against time for a suddenly applied load change in such a system would result in a cyclic curve gradually damped out to zero over an extended period of time. Although this period may be limited as desired, for any particular set of circumstances, by providing a precisely constructed controller, a more positive method is required for mass production purposes where, however slight, nevertheless significant inherent deviations exist in the performance of both mechanical and electrical components.

Accordingly, the primary object of the present invention is to provide improved control means for a turbo-generator unit which overcomes the foregoing difficulties and disadvantages.

Another object is to provide such control means which are relatively simple in construction, light in weight and compact in arrangement, whereby their use with auxiliary power units for inclusion in a guided missile is feasible.

A further object is to provide such control means which can be manufactured on a mass production basis without introducing manufacturing variations tending to deviate uniform error correction time.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are generally accomplished by providing a turbo-generator unit with a frequency error detector and a phase error detector electrically connected on their input sides to the output of the generator and electrically connected on their output sides to a servo-amplifier, a pressure transducer in fluid flow communication with the inlet of the turbine on its inlet side and electrically connected to the servo-amplifier on its output side, and the servo-amplifier having its output in electrical connection with a servo-motor operating a valve to control the flow of motive fluid to the turbine, whereby phase, frequency and pressure error signals are added and amplified to produce an electrical driving impulse for the servo-motor in response to a load transient on the generator output.

Preferred embodiments of the invention have been chosen for purposes of illustration and description, and are shown in the accompanying drawing, forming a part of the specification, wherein:

Fig. 1 is a schematic block diagram showing a gas turbine power package in accordance with the present invention.

Fig. 2 is a schematic block diagram showing the present invention as applied to a steam turbine power package.

Referring to Fig. 1 of the drawing in detail, a power package is shown which comprises a fuel supply 11 in fluid flow connection with a metering valve 12, a decomposition chamber 14 (or combustion chamber, depending upon the class of fuel used) having its inlet in fluid flow connection with the outlet of the valve 12 and having its outlet in fluid flow connection with the inlet of a turbine 15, and an electrical generator 16 driven by the turbine through a gear box 15a.

The output of the generator 16 is electrically connected to a phase error detector 19 and a frequency error detector 20 both of which are electrically connected to transmit phase and frequency error signals, respectively, to a servo-amplifier 21. As indicated in the drawing by the enclosure 17, the phase and frequency error detectors and servo-amplifier may be separately housed and placed in a location remote from the power compartment. The phase and frequency error detectors may be conventional and thus need not be illustrated or described in detail.

A pressure transducer 22 has its input in fluid flow communication with the intake of the turbine 15 and its output electrically connected to the servo-amplifier 21 for transmission of pressure error signals thereto. The output of the servo-amplifier is electrically connected to the servo-motor 24 which has its shaft operatively connected to the metering valve 12 through a gear box 24a to control the valve.

In normal operation, fuel is supplied to the valve 12 which is so adjusted to provide flow sufficient to maintain the turbine speed under a particular generator loading. The fuel, in this particular instance, may be ethylene oxide which decomposes in an exothermal reaction to provide pressurized hot gases for driving the turbine. As constant loading is maintained, the pressure and phase signals are constant, and the frequency error is zero and the metering valve remains in a stabilized setting.

When a sudden electrical power demand is placed upon the generator, an instantaneous drop in speed results, and phase and frequency errors are sensed by the phase and frequency error detectors, respectively. These errors are transmitted to the amplifier which in turn signals the servo-motor to increase the fuel valve opening proportionately to the magnitude of the summed error signals. After the valve opening has been increased, the flow of fuel and or motive fluid increases, thus providing an increased pressure impulse on the transducer 22. The transducer interprets this pressure impulse as an error and translates it into an electrical signal algebraically subtractive from the summed phase and frequency error signals. As more fluid is supplied to the turbine, an increase in speed results; however, the shaft speed increase will lag the fuel flow increase by a sensible time interval. Thus, the phase and frequency error detectors, operating alone to correct for load application, provide signals to increase the valve opening, and as motive fluid proceeds to the turbine inlet, under increased pressure, the transducer senses an error, and transmits a signal which serves to reduce the phase and frequency error signals all before the turbine speed has been corrected, whereby the speed correction time is held to the absolute minimum. Such a system lends itself to adjustment, electrically, for any selected group of mechanical components. Under reverse conditions, which involve the sudden removal of a loading, a reverse set of circumstances occur.

As the foregoing takes place, the pressure transducer senses motive fluid pressure changes reflecting the fluid supplied to which the turbine speed is responsive, and when turbine speed lags, an anticipating effect may be realized in valve adjustment. Thus, by transmitting the pressure change signal to the servo-amplifier and treating it as negative with respect to phase and frequency signals, a much coarser stabilizing correction for phase and frequency may be made to thereby provide more radical valve setting changes to be later compensated by pressure increase responses.

Referring now to Fig. 2 in detail, there is shown a power package of the type using a motive fluid such as steam. This package is identical in construction and operation to that shown in Fig. 1, except that a motive fluid supply 25 has been substituted for the fuel supply 11, whereby the decomposition chamber 14 is omitted because it is not required for operating a steam turbine.

From the foregoing description, it will be seen that the present invention provides a turbine speed control capable of very fast correction upon application of load transients. By providing a transducer installed as illustrated, anticipation of motive fluid adjustment is realized to thus provide a very fast resumption of stabilized operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a turbo-generator unit, the combination of a turbine having an inlet for motive fluid, an electrical generator connected to and driven by said turbine and having an output circuit, a motive fluid flow metering valve in fluid connection with said turbine inlet, an electrical servo-motor connected to said valve to change the setting thereof, a servo-amplifier having an output in electrical connection with said servo-motor, a frequency error detector and a phase error detector having input circuits electrically connected to said output circuit of said generator and having output circuits electrically connected to said servo-amplifier, a pressure transducer having an inlet in fluid flow connection with said turbine inlet and an output electrically connected to said servo-amplifier in a manner such that the signal produced by said transducer opposes the signals produced by said frequency and phase error detectors, whereby phase, frequency and pressure error signals are algebraically added and amplified by said amplifier to produce an electrical driving impulse for said servo-motor in response to a load transient on said generator output.

2. In a turbo-generator unit, the combination of a gas turbine having a motive fluid inlet, an electrical generator connected to and driven by said turbine and having an output circuit, a chamber for converting fuel into pressurized gases having an outlet in fluid flow connection with said inlet of said turbine, a fuel supply tank, a conduit establishing a fluid flow connection between said tank and said chamber, a fuel metering valve in said conduit, an electrical servo-motor connected to said valve to change the setting thereof, a frequency error detector and a phase error detector having input circuits electrically connected to said output of said generator and having output circuits, a servo-amplifier having an input electrically connected to said output of said frequency error detector and said phase error detector, and a pressure transducer having an input side in fluid flow connection with said inlet of said turbine and having an output electrically connected to said servo-amplifier in a manner such that the signal produced by said transducer opposes the signals produced by said frequency and phase error detectors, said servo-amplifier having an output in electrical connection with said servo-motor, whereby phase, frequency and pressure signals are added and amplified by said servo-amplifier to produce an output for operating said servo-motor in response to a transient load on the output of said generator.

3. In a power package system including a turbine having a motive fluid intake, a generator driven by the turbine and having an output, and a servo-motor driven fluid flow control valve for metering the flow of motive fluid to said intake of said turbine, the improvement comprising a frequency error detector and a phase error detector having inputs electrically connected to said output of said generator, a servo-amplifier having an output connected to said servo-motor to control the metering operation of said servo-motor, and a pressure transducer having an input connected in fluid flow communication with said intake of said turbine, said frequency error detector, said phase error detector and said pressure transducer having outputs connected to said servo-amplifier in such a manner that pressure error signals and frequency error signals are added and phase error signals are subtracted therefrom to modify the output of said servo-amplifier.

4. In a turbo-generator unit, the combination of a turbine having an inlet for motive fluid, an electrical generator driven by said turbine, a motive fluid flow metering valve in fluid connection with said turbine inlet, an electrical servo-motor connected to said valve to change the setting thereof, a servo-amplifier having its output in electrical connection with said servo-motor, electrical means for detecting speed variations of said generator having an input electrically connected to said generator and an output electrically connected to said servo-amplifier, a pressure transducer having an input in fluid flow connection with said turbine inlet and having an output electrically connected to said servo-amplifier in such a manner that pressure error signals are subtracted from speed error signals to produce an electrical driving impulse for said servo-motor in response to a load transient on said generator output.

5. In a turbo-generator unit, the combination of a turbine having an inlet for motive fluid, an electrical generator driven by said turbine, means for detecting speed variations of said generator, means measuring the pressure of the motive fluid for detecting the variation in the flow rate of the motive fluid driving said turbine, means responsive to said first and second means for adjusting the flow rate of the motive fluid in the direction opposite to that of the detected speed variation and readjusting the flow rate in the direction opposite to that of the detected flow variation, whereby over-correction of the generator speed is prevented.

References Cited in the file of this patent

UNITED STATES PATENTS

| | | |
|---|---|---|
| Re. 17,161 | Innes | Dec. 11, 1928 |
| 1,505,853 | Brainard | Aug. 19, 1924 |
| 1,969,526 | Rosch | Aug. 7, 1934 |
| 2,243,225 | Schwendner | May 27, 1941 |
| 2,383,306 | Hanna et al. | Aug. 21, 1945 |
| 2,431,501 | Phillips | Nov. 25, 1947 |
| 2,671,860 | Bevins | Mar. 9, 1954 |
| 2,723,528 | Stark et al. | Nov. 15, 1955 |
| 2,768,331 | Cetrone | Oct. 23, 1956 |